United States Patent [19]
Jörg Alexnat et al.

[11] Patent Number: 6,058,702
[45] Date of Patent: May 9, 2000

[54] EXHAUST SYSTEM FOR A MOTOR VEHICLE, AND MOTOR VEHICLE

[75] Inventors: John W. Jörg Alexnat, Vliermaal; Pieter Delfina Steenackers, Heverlee, both of Belgium

[73] Assignee: Scambia Industrial Developments Aktiengesellschaft, Schaan, Liechtenstein

[21] Appl. No.: 08/853,183

[22] Filed: May 8, 1997

[30] Foreign Application Priority Data

May 13, 1996 [CH] Switzerland ............................ 1223/96

[51] Int. Cl.$^7$ ....................................................... F01N 7/00
[52] U.S. Cl. ................................................................ 60/322
[58] Field of Search ............................ 60/299, 322, 323; 181/240, 204; 180/892, 269, 293, 309

[56] References Cited

U.S. PATENT DOCUMENTS

| | | | |
|---|---|---|---|
| 3,490,794 | 1/1970 | Swanson | 60/322 |
| 4,060,143 | 11/1977 | Matsumoto et al. . | |
| 4,192,142 | 3/1980 | Haegele | 60/323 |
| 5,297,517 | 3/1994 | Brandt et al. | 181/204 |
| 5,323,989 | 6/1994 | Hamada et al. . | |
| 5,433,075 | 7/1995 | Nakamura et al. | 60/322 |
| 5,467,747 | 11/1995 | Brandt et al. | 181/204 |
| 5,606,857 | 3/1997 | Harada | 60/322 |

FOREIGN PATENT DOCUMENTS

| | | |
|---|---|---|
| 2620521 | 12/1977 | Germany . |
| 3026730 | 2/1982 | Germany . |
| 3137746 | 6/1983 | Germany . |

OTHER PUBLICATIONS

Patent Abstracts of Japan, publ. No. JP56071627, publ. date Jun. 15, 1981 inventor: Takeuchi Yoshihasa, Title: Fitting of Muffler for Vehicle.

Patent Abstracts of Japan, publ. No. JP1012020, publ. date Jun. 7, 1987 inventor: Niihama Makoto et al, Title: Exhaust System Structure for Engine.

Eurpean Search Report No. SN 27183 CH dated May 24, 1996.

*Primary Examiner*—Marguerite McMahon
*Attorney, Agent, or Firm*—Anderson, Kill & Olick, P.C.

[57] ABSTRACT

A motor vehicle has an internal combustion engine and an exhaust system with an exhaust which has at least one catalytic converter and at least one silencer, for example two silencers. Each silencer is connected fairly firmly to the vehicle bottom and/or chassis of the motor vehicle by at least one holder, for example two holders. The exhaust contains, upstream of the first silencer and between this and the subsequent, second silencer, at least one deformable line member having a bellows for vibrational decoupling and for compensation of the lengthening of rigid exhaust parts caused during operation by the hot exhaust gas. The holders and the said line members enable the pipes and silencer housings of the exhaust to be made thin-walled and light.

35 Claims, 4 Drawing Sheets

EXHAUST SYSTEM FOR A MOTOR VEHICLE, AND MOTOR VEHICLE

BACKGROUND OF THE INVENTION

1. Field of the Invention

The invention relates to an exhaust system for a motor vehicle having a vehicle body and an internal combustion engine, said exhaust system having an exhaust which can be connected to the internal combustion engine and has at least one deformable line member, at least one pipe arranged downstream thereof and at least one silencer arranged downstream of said line member, and having retaining means for holding the exhaust on the vehicle body.

The exhaust system is provided, for example, for a car whose vehicle body has a chassis and a vehicle bottom. However, the exhaust system may also be used for another motor vehicle—for example a truck or a bus. The internal combustion engine may then consist of a gasoline or diesel engine.

2. Description of the Prior Art

During use of a motor vehicle, the internal combustion engine causes the engine housing to vibrate and these vibrations are transmitted via the mechanical connection between the motor housing and the exhaust to the latter. Furthermore, the engine feeds exhaust gas to the exhaust in a pulsating manner, which exhaust gas can also cause the exhaust to vibrate. Vibrations having different vibration modes can therefore be produced in the exhaust. The vibrations of the exhaust give rise to periodic and relatively rapidly changing accelerations of the vibrating parts of the exhaust. Furthermore, driving over holes and other irregularities, driving around curves and accelerating and braking the vehicle cause accelerations of the exhaust. These accelerations caused by driving usually change substantially more slowly than the accelerations caused by the vibrations. The exhaust is moreover heated by the exhaust gas during operation of the engine, the exhaust gas temperature decreasing along the flow path in a direction away from the engine. Owing to the thermal expansion of the rigid parts of the exhaust, the heating results in a temporary lengthening of the exhaust. In known cars, the lengths of the exhaust are, for example, about 4 m and the changes in length which are caused by temperature changes are, for example, about 0.5% to 1%, i.e. about 2 cm to 4 cm.

Exhaust systems having an exhaust and retaining means which have rubber rings holding the exhaust to the vehicle body are known from DE 30 26 730 A, from DE 31 37 746 A and from many cars. If a force is exerted on an exhaust part held in this manner, the rubber rings initially offer only very slight resistance to a deflection of the exhaust out of its rest position. Only when the deflections of the exhaust parts reach certain limits does the resistance offered by the rubber rings increase abruptly. These limits are in practice generally about 1 cm to 2 cm or possibly even more. The parts held by the retaining means can thus move virtually freely within the ranges bounded by the stated limits. U.S. Pat. No. 5,323,989 and U.S. Pat. No. 4,060,143 disclose exhaust systems whose retaining means also have elastic members and permit a fairly free, limited movement of the exhaust, at least in different directions. It is furthermore known from some of the cited publications and from practice that the exhaust can be equipped, between the engine and the (first) silencer, with a deformable line member which has, for example, a bellows or a rubber ring.

The known deformable line members serve primarily as decoupling members for decoupling the silencers arranged downstream of them and other exhaust parts from the engine in terms of vibration. Since the known exhausts and in particular their parts arranged downstream of the deformable line members can move fairly freely within certain limits, transverse vibrations of large amplitudes are frequently produced in the exhausts, in spite of the deformable line members. This is the case in particular when the exhausts have resonances in the range of the fundamental vibrations produced by the engine. The vibrations and other accelerations and forces acting on the exhaust result in severe stress on the pipes belonging to the exhaust, on silencer housings and on deformable line members. The pipes of an exhaust therefore have a wall thickness of at least 1.5 mm in the case of cars. The silencers usually have housings with casings and end walls whose wall thicknesses are likewise more than 1 mm and frequently at least 1.5 mm in the case of cars. The exhaust pipes and silencer housings of trucks generally have even greater wall thicknesses. The exhaust of the known exhaust systems is therefore heavy. Moreover, a heat shield which increases the weight must often also be arranged between the or each silencer and the vehicle bottom in known exhaust systems. The high weight of the known exhaust systems requires a great deal of material for their manufacture, for example a great deal of relatively expensive stainless steel, and increases in particular the fuel consumption during driving. Furthermore, in spite of the large wall thicknesses, exhaust fractures occur fairly frequently. Since the silencers of the known exhausts are usually deflected transversely relative to the general longitudinal direction of the exhaust, starting from their average and/or rest position, in various transverse directions up to at least 1 cm and often up to 2 cm or even more, they also require space for their transverse movements in addition to the space which they occupy. This often has the disadvantage that the silencers cannot be dimensioned as large as would be desirable for good silencing.

SUMMARY OF THE INVENTION

It is the object of the invention to avoid disadvantages of the known exhaust systems and in particular to provide an exhaust system which, with regard to the flow rate of the exhaust gas to be discharged through the exhaust system and with regard to the length and characteristic cross-sectional dimensions of the exhaust, has a low weight and is nevertheless durable.

This object is achieved, according to the invention, by an exhaust system for a motor vehicle having a vehicle body and an internal combustion engine, said exhaust system having an exhaust which can be connected to the internal combustion engine and has at least one deformable line member, at least one pipe arranged downstream thereof and at least one silencer, with a housing, arranged downstream of said line member, and having retaining means for holding the exhaust on the vehicle body, wherein the or at least one pipe essentially has a wall thickness of at most 1 mm.

According to another object of the invention, there is provided an exhaust system for a motor vehicle having a vehicle body and an internal combustion engine and defining a longitudinal direction, said exhaust system having an exhaust which can be connected to the internal combustion engine and has at least one deformable line member, at least one pipe arranged downstream thereof and at least one housing which is arranged downstream of said line member and contains catalyst means and/or belongs to a silencer, and having retaining means for holding the exhaust on the vehicle body, wherein the retaining means is formed for holding the housing or at least the first housing following the first said line member along the exhaust in the direction of flow of the exhaust gas in such a way that this housing is deflected at most 5 mm in some direction perpendicular to the longitudinal direction of the motor vehicle under the action of a constant acceleration of 10 m/s$^2$ or of a constant force of 100 N.

As a result of such a relatively rigid fastening, at least resonances of transverse modes of vibration of the (first) housing arranged downstream of the (first) elastically deformable line member and thus virtually of the entire exhaust part arranged downstream of said line member are substantially suppressed. Accordingly, the vibration amplitudes and other movements of said exhaust part which are caused by driving are also greatly reduced. This in turn makes it possible for the pipes and housings arranged downstream of the (first) elastically deformable line member to be made thin-walled and light and nevertheless to achieve a long life of the exhaust. The reduction in the transverse deflection furthermore makes it possible to increase the diameter or other cross-sectional dimensions of a silencer housing without the latter impacting against the vehicle bottom or other parts of the vehicle body as a result of vibrations or other accelerations. Such an increase in the size of the silencer housing in turn permits an improvement in the silencing.

According to the invention, at least a large part of the exhaust can be made very thin-walled. Consequently, the weight of an exhaust system according to the invention can be considerably reduced compared with the weight of known exhaust systems having similar passage cross-sectional areas, cross-sectional dimensions and lengths of the various exhaust parts. The weight of the exhaust part arranged downstream of the first elastically deformable line member in the direction of flow of the exhaust gas may, for example, be reduced by about or more than 50% with otherwise approximately identical dimensions.

According to a further object of the invention there is provided a motor vehicle having a vehicle body, an internal combustion engine and an exhaust system as claimed in claim 1, wherein the exhaust of the exhaust system is connected to the internal combustion engine and wherein the or each housing is held on the vehicle body by the retaining means.

In an advantageous further development of the subject of the invention, a layer of a sound-absorbing and heat-insulating insulation material is present between the casing of the housing and a hollow interior in the housing of the or each silencer. Furthermore, sound-absorbing and heat-insulating insulation material is preferably also present between each end wall and the hollow interior of the or each silencer. If the exhaust has a catalytic converter arranged downstream of the first elastically deformable line member and/or underneath the vehicle bottom, the housing of said catalytic converter can also have analogously arranged sound-absorbing and heat-insulating insulation materials. These insulation materials preferably consist of mineral fibers, for example of basalt wool and/or other rockwool and/or possibly glass wool. Such a material has high heat resistance and a relatively low density. Such heat insulation of the or of at least one or of each housing arranged underneath the vehicle body makes it possible to minimize the heat transmission to the vehicle bottom in spite of thin-walled housings and to dispense with the mounting of a metallic heat shield on the vehicle bottom and thus additionally to save weight.

The retaining means preferably have, for the or each housing which is arranged downstream of at least the (first) elastically deformable line member, at least one holder which is connected directly to the housing.

It is then not necessary to hold the pipe itself directly on the vehicle body. Since a silencer and/or catalytic converter having a housing usually has a larger dimension and a greater weight per unit length than a pipe, retaining means directly engaging the or each housing help to achieve stable fastening of the various parts of the exhaust and little mechanical stress on said parts.

BRIEF DESCRIPTION OF THE DRAWINGS

The subject of the invention is described below with reference to embodiments shown in the drawings. In the drawings.

DESCRIPTION OF THE PREFERRED EMBODIMENTS

Figure 1:
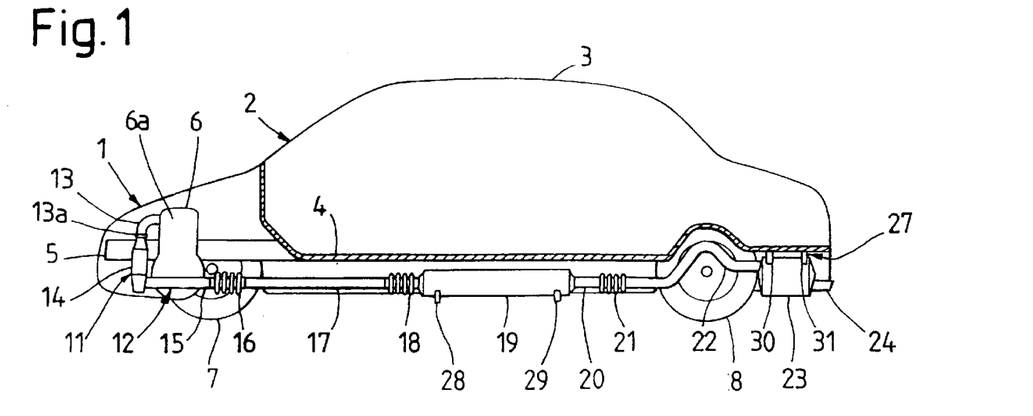
FIG. 1 shows a schematic motor vehicle with an exhaust system, drawn partly as a view and partly as a section.

The motor vehicle 1 shown schematically in FIG. 1 consists of a car and has a vehicle body 2. This has self-supporting bodywork 3, a vehicle bottom 4 and a chassis 5. The vehicle body 2 holds an internal combustion engine 6, front wheels 7, rear wheels 8 and an exhaust system denoted as a whole by 11. The internal combustion engine 6 has an engine housing 6a which is fastened in a vibration-damping manner to the chassis 5 and has a plurality of exhaust outlets, each of which is coordinated with a cylinder of the engine. The exhaust system 11 has an exhaust 12 as the main component. This has, in sequence in the direction of flow of the exhaust gas, an inlet and collecting means 13, a catalytic converter 14, a short pipe 15, a first elastically deformable line member 16, a longer, straight pipe 17, a second elastically deformable line member 18, a first silencer 19, a short pipe 20, a third elastically deformable line member 21, a longer, bent pipe 22, a second silencer 23 and an outlet pipe 24 opening into the environment. The internal combustion engine 6 is located at the front end of the motor vehicle 1. The exhaust 12 is in general approximately parallel to the longitudinal and driving direction of the motor vehicle 1, from the internal combustion engine 6 to the rear of the motor vehicle, and is for the most part underneath the vehicle bottom 4. Furthermore, retaining means 27 belong to the exhaust system 11. Said retaining means have four holders 28, 29, 30, 31 which connect the two silencers 19 and 23 in the vicinity of their ends to a rigid part of the vehicle body 2, namely to the vehicle bottom 4.

The inlet and collecting means 13 has an exhaust manifold which has, for each exhaust gas outlet of the engine, a bent inlet pipe whose entrance is connected to one of the exhaust gas outlets of the engine housing. The means 13 furthermore has common connecting means connecting the outlets of the inlet pipes to one another and a common outlet 13a for all inlet pipes. The inlet and collecting means 13 is, for example, completely rigid but may have at least one elastically deformable decoupling element with a bellows or the like, which connects one of the inlet pipes to the common outlet 13a. The common outlet 13a should, however, be rigidly connected to at least one of the inlet pipes and to the engine housing 6a by the common connecting means. The catalytic converter 14 has a rigid housing with an inlet which is rigidly connected to the common outlet 13a of the inlet and collecting means 13. The pipes 15, 17, 20, 22, 24 are rigid. The inlet and collecting means 13, the housing of the catalytic converter 14 and the pipes 15, 17, 20, 22 and 24 consist of metallic materials, for example stainless steel. The means 13, the housing of the catalytic converter 14 and the pipe 15 are tightly connected to one another, namely welded.

Figure 2:
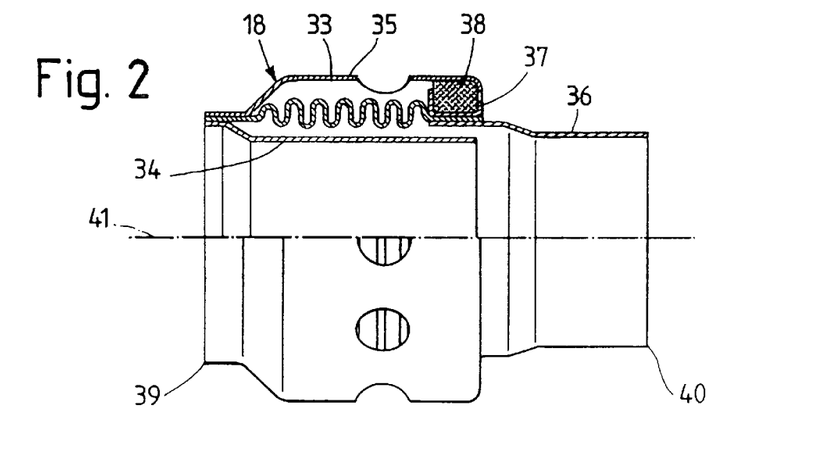
FIG. 2 shows an elastically deformable line member of the exhaust system, drawn partly as a view and partly as a longitudinal section.

The three elastically deformable line members 16, 18, 21 are shown only schematically in FIG. 1 and have, for example, a metallic, namely stainless steel, flexible, bendable, extendable and shortenable bellows whose ends are tightly and firmly connected to the respective preceding and following exhaust parts, for example welded indirectly or directly. The line members 16, 18, 21 may also have additional parts. The second elastically deformable line member 18 is formed, for example, according to FIG. 2 and has, as main components, a bellows 33, an inner sleeve 34 present inside said bellows and an outer sleeve 35 enclosing the bellows in cross-section and serving as a protective casing, and a socket 36. The line member 18 furthermore has a ring 37 which is approximately U-shaped in cross-section and has a channel opening outward and a deformable damping member 38 held therein. This is formed by a multilayer wire fabric formed into a ring with a solid cross-section and projects outward out of the channel of the ring 37. Said parts of the line member 18 consist of metallic materials, for example stainless steel. The bellows 33 has a cylindrical end section at both ends and is connected rigidly and tightly, namely welded, to the ends of the two sleeves 34, 35 at its end located on the left in FIG. 2. These ends of the bellows 33 and of the sleeves together form the first connection 39—namely the inlet—of the line member 18. That end of the bellows which is located on the right in FIG. 2 is connected firmly and tightly, namely welded, to the further end section of the socket 36 and to the ring 37. The other, narrower end section of the socket 36 forms the second connection 40—namely the outlet—of the line member. The inner sleeve 34 projects into the further end section of the socket 36. The cylindrical main section of the inner sleeve 34 is separated by annular gaps from the inner wave summits of the bellows 33 and from the inner surface of the socket 36. The outer sleeve 35 has a cylindrical middle section which is separated from the outer wave summits of the bellows by an intermediate space and has a few holes. That end section of the outer sleeve 35 which is located on the right in FIG. 2 is bent inward and wraps around a section of the damping member 38. The line member 18 is in general rotationally symmetrical with respect to an axis 41.

The first and the third elastically deformable line members 16 and 21, respectively, are, for example, formed identically or similarly to the second elastically deformable line member 18. The line members 16, 18, 21 can, however, also have different dimensions and/or be formed differently and can be modified in various ways. The inner sleeve 34 may be omitted, for example to increase the flexibility of the bellows. Furthermore, the outer sleeve 35, the ring 37 and the damping member 38, for example in particular in the first line member 16 or in all line members 16, 18, 21, can be replaced by a flexible, extendable and shortenable casing formed from wires or metal bands.

The first elastically deformable line member 16 serves in particular as a vibration damper and decoupling element and is intended to decouple those parts of the exhaust 12 which are located downstream of the line member 16 with respect to the direction of flow of the exhaust gas, with regard to vibration, from the engine and as far as possible substantial possible substantially to prevent vibrations produced during operation of the engine from being transmitted from the engine housing to the exhaust parts located downstream of the line member 16. The second and the third line members 18 and 21, respectively, likewise serve for decoupling with regard to vibrations. The first and the second line members 16 and 18, respectively, are intended to decouple the exhaust parts located downstream of them from the engine housing also with regard to other movements, i.e. movements not caused by vibrations, in particular tilting movements.

The bellows of the three line members 16, 18, 21 and in particular of the second and third line members 18 and 21, may furthermore change their lengths under elastic deformations and in particular be shortened along their axes, starting from their rest states. In the case of the second line member 18 shown separately in FIG. 2, the two sleeves 34, 35 are, for example, then displaced to the right toward the connection 40, starting from the rest state shown, which is assumed when the engine is not operating. That distance of the two connections 39, 40 which is measured parallel to the axis 41 of the line member 18, i.e. the length of the line member, can be changed preferably by at least 5 mm and, for example, by up to about 10 mm or even slightly more, i.e. decreased and/or increased starting from a rest state. The first and the third line members 16 and 21, respectively, can also preferably change their length, i.e. decrease and/or increase it starting from a rest state, by at least 5 mm and, for example, up to about 10 mm or even more.

The two line members 16 and 18 can compensate changes in the lengths of the pipes 15 and 17 and of other fixed exhaust parts located upstream of the first silencer 19, said changes in length being caused by temperature changes. The two line members 16, 18 can together compensate length and other dimensional changes which are parallel to their axes and/or to the longitudinal direction of the motor vehicle and/or to the axis of the first silencer 19 and are up to at least 5 mm or up to at least 10 mm or even up to about or more than 20 mm. The third line member 21 can compensate changes in lengths of the pipes 20, 22 located between the two silencers 19, 23. The third line member 21 can compensate changes in length and/or other dimensional changes in a direction parallel to its axis and/or to the longitudinal direction of the motor vehicle and/or to the axes of the first silencer 19 and/or second silencer, which changes are at least up to 5 mm and, for example, up to at least 10 mm.

Figure 3:
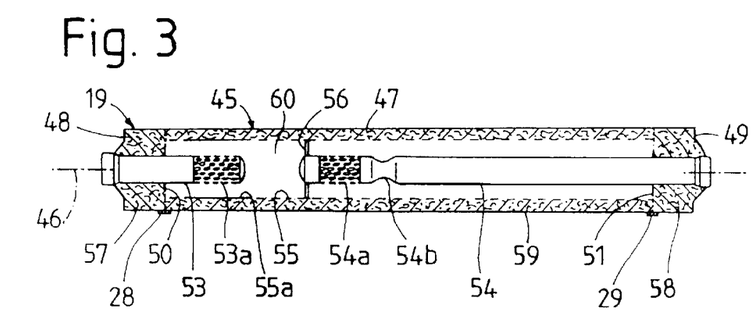
FIG. 3 shows a longitudinal section through the first silencer of the exhaust system.
Figure 4:
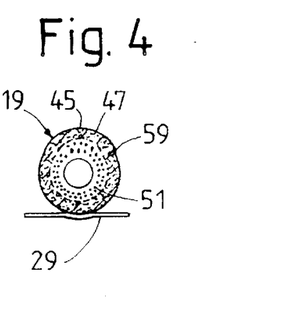
FIG. 4 shows a cross-section through the first silencer.

The first silencer 19 shown separately in FIGS. 3 and 4 has a elongated, tight housing 45 which is in general rotationally symmetrical with respect to a straight axis 46. The wall of the housing 45 has an essentially cylindrical casing 47 and two end walls 48 and 49 which face away from one another and are tightly and firmly connected to the casing. The two end walls are, for example, at least partly conical or vaulted in order to stiffen the housing. The housing 45 contains two gas-permeable partitions 50, 51, each of which is located in the vicinity of one of the end walls 48, 49 and consists of an essentially flat, annular disk. The two partitions 50, 51 are perforated at least in places and preferably also have at least one compact, unperforated region for achieving good rigidity. The silencer 19 has two pipes 53 and 54 coaxial with the axis 46. The pipe 53 passes through the end wall 48 present at the left end of the silencer and through partition 50. The other pipe 54 passes through the end wall 49 and the partition 51. The pipes 53, 54 are connected rigidly and tightly to the end walls 48 and 49, respectively. The partitions 50, 51 are connected firmly and more or less tightly to the casing 47 and/or to the pipes 53 and 54, respectively, and have, for example, flanges fastened to the casing by spot welds. The outer end of the pipe 53 forms the inlet connection of the silencer 19 and is connected to the line member 18. The outer end of the pipe 54 forms the outlet connection of the silencer 19 and is connected via the pipe 20 to the line member 21. Each pipe 53, 54 has a gas-permeable, perforated section 53a or 54a, respectively, in the vicinity of its inner end. The pipe 54 also has a constriction serving as a throttle 54b between its perforated section 54a and its end serving as the outlet connection. The inner ends of the two pipes 53, 54 are separated from one another in the axial direction by an intermediate space. The inner end of the pipe 53 is more or less tightly closed by being squeezed together or may be open. The inner end of the pipe 54 is squeezed together and more or less tightly closed. The housing 54 contains a generally cylindrical inner casing 55 between the two partitions 50 and 51. Said inner casing consists of two sleeve-like inner casing parts, each of which is fastened at one end to one of the partitions 50, 51. The other end sections of the two inner casing parts, which end sections face away from one another, enclose one another with at most little play and can be displaced relative to one another in a direction parallel to the axis 46. The two-part inner casing 55 is gas-permeable and perforated in the major part of its length but has, in the vicinity of its end located on the left, a compact, i.e. hole-free, section 55a which encloses the axis 46, extends over the length of the perforated pipe section 53a and, for example, projects slightly beyond the latter at both ends. That section of the pipe 54 which is essentially located inside the housing 45 is longer than half the length of the housing and is supported at its inner end by a few rod-like supports 56 on the inner casing 55. The housing 45, the partitions 50, 51, the two pipes 53, 54, the inner casing 55 and the supports 56 consist of metallic materials, for example stainless steel. The annular intermediate spaces present between the end wall 48 and the partition 50 and between the end wall 49 and the partition 51 and enclosing the pipes 53 and 54, respectively, are filled with a layer of filling of heat-insulating and sound-absorbing material 57 and 58, respectively. The intermediate space which is annular in cross-section and is located between the two partitions 50, 51 and between the casing 47 of the housing and the inner casing 55 is likewise filled with a layer of heat-insulating and sound-absorbing materials 59. The materials 57, 58, 59 consist, for example, of fibers of the type stated in the introduction. On the other hand, the interior 60 enclosed in cross-section by the inner casing 55 and present between the two partitions 50, 51 is hollow and empty—apart from the pipes 53, 54 and supports.

Figure 5:
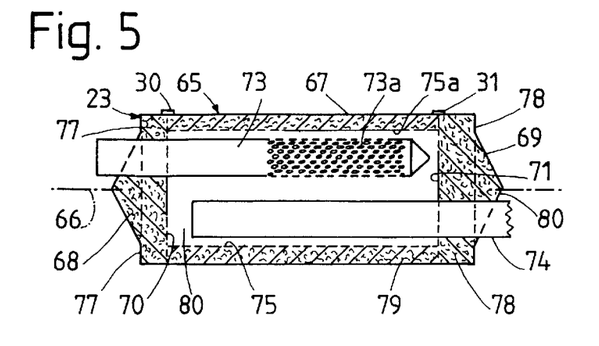
FIG. 5 shows a longitudinal section through the second silencer of the exhaust system.
Figure 6:
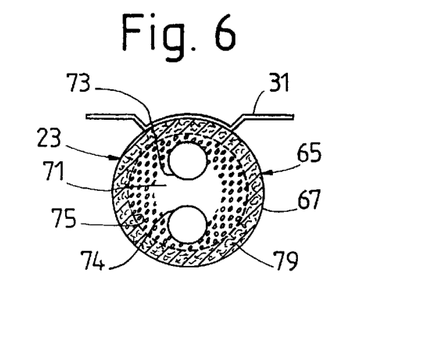
FIG. 6 shows a cross-section through the second silencer.

The second silencer 23 shown separately in FIGS. 5 and 6 has a housing 65 with a straight axis 66. The housing has a cylindrical casing 67 and two end walls 68, 69. The housing contains two disk-like, perforated partitions 70, 71 which are gas-permeable at least in places. The silencer 23 has two pipes 73 and 74. The pipe 73 passes through the end wall 68 and the partition 70. The pipe 74 passes through the end wall 69 and the partition 71. The housing 65 of the second silencer 23 is shorter than the housing 45 of the first silencer 19 but has a larger diameter than the housing 45. The pipes 73, 74 are parallel to the axis 66 but arranged on different sides thereof.

Furthermore, the two pipes 73, 74 have sections present side by side in the same longitudinal region of the housing 65. The outer end of the pipe 73 forms the inlet connection of the second silencer 23 and is connected to the pipe 22. The pipe 73 is squeezed together at its end present in the housing 65 and is more or less tightly closed or open and has a gas-permeable, perforated section 73a in the vicinity of this end. The pipe 74 is open at its inner end and has no perforated section. The outer end of the pipe 74 forms the outlet connection of the second silencer 23 and is connected to the outlet pipe 24 and/or forms the latter. The second silencer 23 has an inner casing 75 which, as in the case of the first silencer, consists of two inner casing parts which project one into the other and are displaceable relative to one another. The inner casing 75 is for the most part gas-permeable and perforated but has a compact, hole-free section 75a. This extends over a slightly longer longitudinal region than the perforated section 73a of the pipe 73 but does not completely enclose the axis 66 and instead occupies only a circumferential region of the inner casing, which region is present in the vicinity of the pipe 73.

The two intermediate spaces present between the end walls 68, 69 and one of the gas-permeable partitions 70 and 71 contain a material 77 or 78, respectively. The intermediate space present between the housing casing 67 and the inner casing 75 contains a material 79. The materials 77, 78, 79 are once again heat-insulating and sound-absorbing and consist of mineral fibers. The interior 80 present between the two partitions 70 and 71 and enclosed in cross-section by the inner casing 75 is hollow and empty apart from the pipes 73, 74. Unless stated otherwise above, the second silencer 23 is formed similarly to the first silencer 19.

Figure 7:
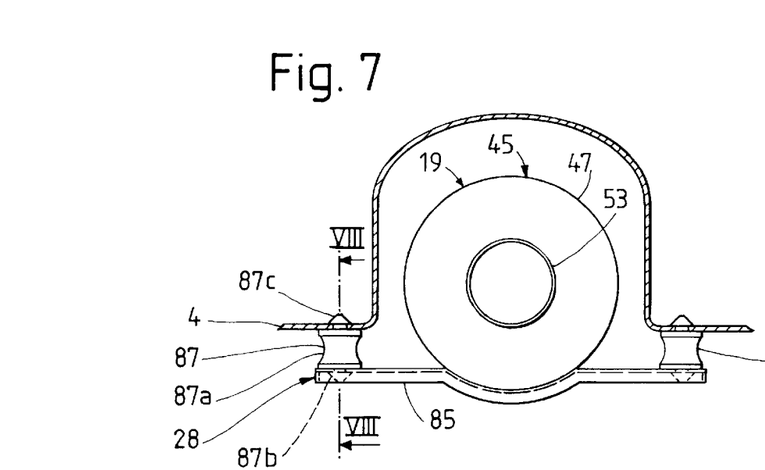
FIG. 7 shows a section through the vehicle bottom and a view of the first silencer and of a holder serving for fastening the latter.
Figure 8:
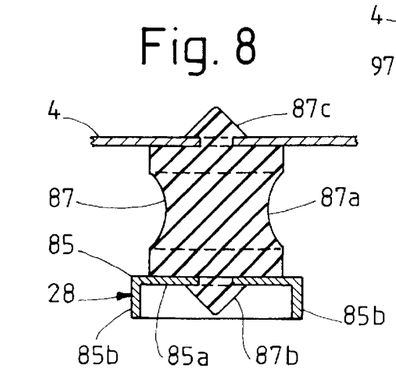
FIG. 8 shows a section through a holder along the line VIII—VIII of FIG. 7 on a larger scale.

The-holders 28, 29, 30, 31 shown schematically in FIG. 1 and intended for fastening the two silencers 19 and 23 may—depending on the design of the vehicle bottom 44—be formed and dimensioned differently or may all be identical. The two holders 28, 29 serving for fastening the first silencer 19 are, for example, formed identically or similarly, are a distance apart along the silencer axis 46 and are fastened in the vicinity of the two ends of the silencer 19, namely at its partitions 50 and 51, to its casing. The holder 28 is formed, for example, according to FIGS. 7 and 8. FIGS. 7 and 8 also show a section of the vehicle bottom 4. This is, for example, generally more or less flat but has an upward-projecting bulge. This bounds a channel which is open in a downward direction and which is frequently referred to as a tunnel and in which at least a part of the exhaust 12 and in particular at least a cross-sectional region of the first silencer 19 shown as an end view in FIG. 7 are located.

The holder 28 has a retaining member 85 directly engaging the housing 45 of the first silencer 19, and two connecting members 87 connecting said retaining member to the vehicle bottom 4. The retaining member 85 consists of a metallic material, for example stainless steel. The retaining member 85 is rigid, elongated and arranged perpendicularly to the silencer 19 and consists essentially of a U profile rod having a web 85a and two limbs 85b. The U profile rod is reinforced at the ends by end members which are welded to the limbs and either are also welded to the web or are integral therewith. The middle section of the retaining member 85 is curved parallel to the casing 47 of the silencer housing 45, rests with the outer, top surface of the web 85a on the lower side of the silencer housing 45, against the casing 47, and is fastened to the casing 47, for example, by spot welds or other weld joints. Each connecting member 87 is at least partly elastically deformable and consists, for example, of a one-piece, rubber-elastic body of synthetic and/or natural rubber. Each connecting member is essentially rotationally symmetrical with respect to an axis and has a main section 87a which is in general cylindrical but slightly concave in axial section in the middle region. Said main section has a solid cross-section over its entire axial dimension and thus contains no cavities or intermediate spaces or holes. The main section 87a has flat, annular support and/or end surfaces at its two ends and is associated in the middle region of each end with an approximately mushroom-shaped extension which projects away therefrom in the axial direction and forms fastening and/or connecting means 87b and 87c. The two connecting members 87 belonging to the same holder 28 or 29 are displaced relative to one another along the retaining member 85 of the relevant holder and are arranged in the vicinity of the ends of the retaining member. Each connecting member lies with the flat support and/or end surfaces of its main section 87a against the upper surface of the web 85a of the retaining member or against a section of the lower surface of the vehicle bottom 4. During assembly of the exhaust, the mushroom-shaped fastening and/or connecting means 87b, 87c are pushed through holes in the web 85a or vehicle bottom 4 under a temporary elastic deformation and snap in so that the heads of the fastening and/or connecting means grip behind the web 85a and the vehicle bottom 4. The retaining members 85 and the first silencer 19 welded thereto are then detachably connected to the vehicle bottom 4 by the connecting members 87.

In the mounted state, the first silencer 19 is thus held on the vehicle bottom 4 of the vehicle body 2 by four connecting members 87. The four connecting members 87 together form a four-point suspension. The midpoints of the four connecting members 87 holding the first silencer define a quadrilateral, for example a rectangle, in a vertical projection onto a horizontal plane on which the motor vehicle 1 stands. Two connecting members are present on each side of the vertical plane passing through the axis 46.

The second silencer 23 is arranged, for example, in the vicinity of the rear end of the motor vehicle 1, behind its rear axle, underneath a more or less flat section of the vehicle bottom 4. The front holder 30 which serves for holding the second silencer on the vehicle bottom 4 is shown particularly clearly in FIG. 9 and has a rigid, elongated, metallic retaining member 95 and two at least partially elastically deformable connecting members 97. The retaining member 95 is formed similarly to the retaining members 85 but rests with the middle section of its web on the upper side of the silencer 23, against the casing 67 of its housing 65. The connecting members 97 of the holder 30 are formed identically or similarly to the connecting members 87 and project from above into the channel of the retaining member 95 and rest against the inner surface of its web. The rear holder 31 of the second silencer is formed, for example, identically or similarly to the front holder 30. Unless stated otherwise above, the holders 30, 31 are formed identically or similarly and are fastened to the silencer and to the vehicle bottom in the same way as the holders 28, 29.

That part of the exhaust 12 which is located downstream of the catalytic converter 14 is in general approximately parallel to the longitudinal and main driving direction of the motor vehicle 1. The axes of the elastically deformable line members 16, 18 and 21 are straight and, for example, approximately parallel to the longitudinal and main driving direction of the motor vehicle in the rest state. The axes of the silencers are, for example, at least approximately parallel to the longitudinal and driving direction of the motor vehicle.

The catalytic converter 14 and the pipe 15 are rigidly connected to the engine housing 6a by the inlet and collecting means 13. Owing to their elastic deformability, the rubber-elastic connecting members 87, 97 of the holders 28, 29, 30, 31 permits small deflections of the silencer housings 45 and 65 from the rest positions of these housings. However, even in the case of very small deflections in any direction, the connecting members consisting of compact rubber elements generate restoring forces which oppose said deflections and increase steadily, monotonically and, for example, more or less linearly with the deflection within a certain range as the deflection increases. The connecting members 87, 97 thus permit certain but only relatively small movements of the silencer housings. The connecting members furthermore provide a vibration-damping connection between the silencer housings and the vehicle body. The connecting members 87, 97 of the holders 28, 29, 30, 31 are preferably formed in such a way that, in the assembled exhaust, each silencer housing 45, 65 is deflected relative to the vehicle body by at most 5 mm and preferably at most 2 mm from the middle and/or rest position of the relevant housing by a constant, stationary acceleration of 10 m/s$^2$ and, for example, also 20 m/s$^2$ and even 50 m/s$^2$ acting on one or each housing 45, 65 or by a constant, stationary force of 100 N in any direction. In the assembled exhaust, the housings 45, 46 are then deflected or displaced by at most 5 mm and preferably at most 2 mm from a middle and/or rest position, in particular also by accelerations or forces which have the stated magnitudes in any desired direction and, for example, are approximately parallel to the longitudinal and main driving direction of the motor vehicle and approximately parallel to the axes 46, 66 of the housings 45, 65 or, for example, have some direction approximately perpendicular to the longitudinal direction of the motor vehicle and to the axes 46, 66. The holders may be formed, for example, in such a way that the deflections of the two silencer housings under the stated accelerations or forces are within the stated ranges even when the housings 45, 46 are separated from the remaining exhaust parts and from one another.

As already mentioned in the introduction, the exhaust is heated by the exhaust gas fed to it from the internal combustion engine. The exhaust manifold is heated by the exhaust gas to, for example, a temperature of at least 1000° C. The front pipes 15, 17 are heated, for example, to temperatures in the range from 500° C. to 800° C. and the rear pipes 20, 22, 24 to temperatures from about 200° C. to 500° C. The heated parts of the exhaust temporarily expand so that in particular the pipes 15, 17, 20, 22 become longer. The pipes and housings consist, for example, of steel having a linear coefficient of expansion of about $1.2 \cdot 10^{-5}/°C$. The pipes 15, 17 are then lengthened, for example, by about 0.6% to 1% and the pipes 20, 22, 24 by about 0.2% to 0.6%.

The pipes 53, 54, 73, 74 in the silencers are likewise heated by the exhaust gas and also lengthened. Since these pipes are fastened only at one end to the housing of the relevant silencer and are free at the other end, they can increase in length unhindered, without generating tensions. The exhaust gas also heats the inner casings 55 and 75 of the silencers. Since each inner casing consists of two parts whose one end is fastened and whose other end is displaceable, the changes in the lengths of the inner casing parts likewise generate no stresses.

The materials 57, 58, 59, 77, 78, 79 present in the housings of the silencers and consisting of fibers insulate the casings 47, 67 thermally from the exhaust gas so that these casings are heated at most relatively slightly by the exhaust gas to temperatures of, for example, about 100° C. to 300° C. Furthermore, this prevents damage to the rubber members of the holders by heating. Since the casings 47, 67 are at most slightly heated by the hot exhaust gas, the high temperature of the exhaust gas also causes at most small changes in the lengths of the casings 47, 67. The total increase in length of the exhaust is thus reduced in comparison with a conventional exhaust having housings without heat insulation. Any change in the length of the housing can be absorbed by the deformation of the rubber-elastic connecting members of the holders. As a result of the heat insulation, the generation of tensions in the casings by the hot exhaust gas is at least substantially avoided, although said casings are almost immovably connected to the vehicle bottom at both ends.

The intermediate spaces of the silencers, which spaces contain the materials 57, 58, 59, 77, 78, 79 are connected through the perforation holes of the partitions 50, 51, 70, 71 and inner casings 55, 75 to the hollow, free interiors 60 and 80 through which the exhaust gas flows. The sound-absorbing materials consisting of fibers therefore also result in a substantial improvement in the silencing.

The thermally caused changes in the lengths of the pipes 15, 17, 20 and the changes in the lengths of the silencer housings are compensated at least for the most part by the elastically deformable line members 16, 18, 21. Consequently, at most small stresses and forces caused by temperature changes act on the pipes and silencers. The silencers are displaced as a result of the thermally caused changes in the lengths of the pipes and the resulting residual forces not compensated by the deformable line members 16, 18, 21 at most slightly, for example at most 2 mm, against the restoring forces generated by the deformable line members 87, 97, any such displacements of the silencers being approximately parallel to the axes thereof.

As already described in the introduction, during the use of the motor vehicle, vibrations of the various exhaust parts may be induced by the vibrations of the engine housing and via the pulsating exhaust gas, and furthermore accelerations acting on the exhaust parts may be caused as a result of driving. Of the exhaust parts arranged downstream of the first elastically deformable line member 16, the silencers have the greatest mass per unit length. The connections of the silencers to the vehicle body 2, which are somewhat mobile, springy and vibration-damping but fairly rigid, prevent strong resonant vibrations, vibrations having large amplitudes and other relatively large movements of the silencers. The pipes 15, 17, 20, 22 and in particular the two silencers 19, 23 are deflected by the vibrations generated during normal operation of the internal combustion engine and by any vibrations induced by the pulsating exhaust gas, by at most 5 mm, preferably at most 2 mm and normally at most 1 mm or even at most 0.5 mm in all directions from their mean positions which they occupy as a result of the thermal changes in dimensions after reaching the operating temperatures. The deflections from the stated mean positions, which are caused during normal driving of the motor vehicle by unevenness of the ground, curves, acceleration and braking processes, and caused by accelerations acting on the exhaust are likewise at most 2 mm and normally at most 0.5 mm in all directions. Furthermore, the total silencer deflections which are caused by temperature changes, vibrations and other accelerations are also at most 5 mm and preferably at most 2 mm in all directions during normal driving, starting from rest positions assumed with the stationary engine in the cold state.

The pipes arranged downstream of the catalytic converter 14 and in particular of the first elastically deformable line member 16 need not absorb large accelerations and forces caused by the vibrations or by driving. The pipes 15, 17, 20, 22 therefore need support essentially only their own weight and possibly also partly the weight of the elastically deformable line members 16, 18, 21. It is therefore not necessary for the pipes 15, 17, 20, 22, 24 to be held on the vehicle body by holders directly engaging said pipes themselves. The pipes 15, 17, 20, 22, 24 and the pipes 53, 54, 73, 74 present in the silencers may furthermore be made relatively thin-walled and have wall thicknesses which are at least essentially not more than 1 mm, preferably not more than 0.8 mm and, for example, about 0.5 mm. It should be noted that the pipes may, at the connecting points, overlap the parts connected to them, possibly resulting there in exhaust sections having a slightly thicker wall. However, any thicker sections of this type which may be present are then relatively short and very much shorter than the entire exhaust. The walls of the pipes of the exhaust manifold of the inlet and collecting means 13 may likewise be slightly thinner than in the case of conventional exhaust systems not according to the invention and may have thicknesses similar to the pipes arranged after the catalytic converter 14. The casings 47, 67, end walls 48, 49, 68, 69 and partitions 50, 51, 70, 71 and inner casings 55, 75 of the two silencers likewise need have only small wall thicknesses. At least in the case of the largest parts of these casings and walls, these wall thicknesses are at most 1 mm, preferably at most 0.8 mm and, for example, about 0.5 mm.

The materials 59 and 79 present between the casings 47, 67 and the inner casings 55 and 75 of the silencers and consisting of fibers form layers whose layer thicknesses measured in cross-section in the radial direction are at least 10 mm and, for example, about 20 mm. The dimensions, measured in the axial direction, of the materials 57, 58, 77, 79 present between the end wall and the partition are at least 10 mm, preferably at least 20 mm and, for example, 25 mm to 80 mm.

Figures 10, 11, 12:
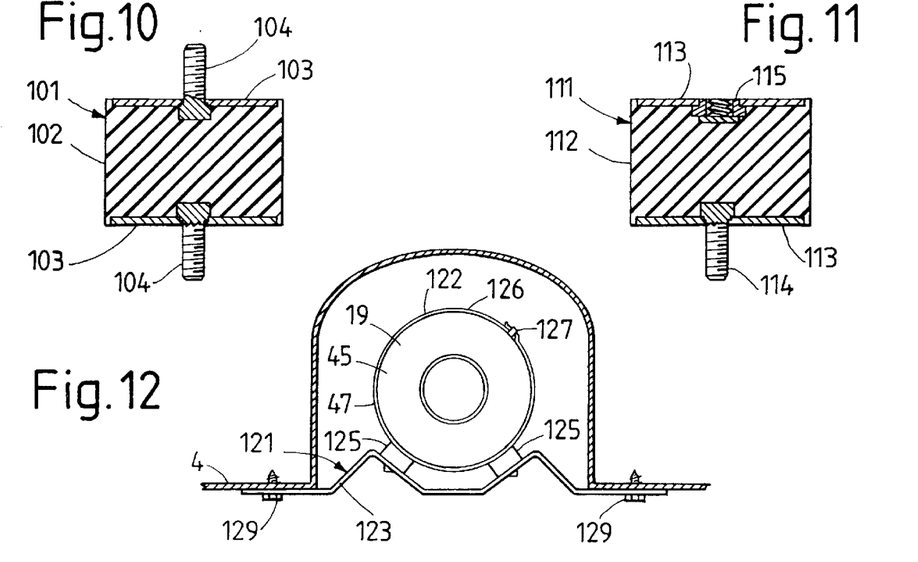
FIG. 10 shows an axial section through a variant of a connecting member of a holder.
FIG. 11 shows an axial section through yet another connecting member of a holder.
FIG. 12 shows a diagram analogous to FIG. 7 and illustrating another holder.

The connecting member 101 shown in FIG. 10 consists of a composite and is essentially rotationally symmetrical with respect to an axis. The connecting member 101 has an essentially cylindrical rubber member 102 which consists of natural and/or synthetic rubber and is provided with a recess at each of its two ends. Each recess contains a flat plate 103 having a central hole and the head of a screw which forms a fastening and/or connecting means 104 and passes through the hole in the plate and has a thread part projecting axially away from the rubber member 102. The two plates 103 and the fastening and/or connecting means 104 consist of a metallic material, for example steel, and are connected firmly and nondetachably to the rubber member by molding on and/or vulcanizing on the rubber and/or by adhesive bonding or the like. The rubber member has a solid cross-section between the recesses filled by the plates 103 and fastening and/or connecting means 104. The plates 103 and those edges of the rubber member 102 which enclose said plates together form flat support and/or end surfaces of the connecting member 101.

As in the case of the connecting member 101, the connecting member 111 shown in FIG. 11 consists of a composite having a rubber member 112, two plates 113 and fastening and/or connecting means 114, 115. The fastening and/or connecting means 114 are screw-like as in the case of the connecting member 101. The other fastening and/or connecting means 115 are formed by a threaded bush or nut which projects from the rubber member into the hole in the plate and whose threaded hole is closed by a disk at that end of the fastening member which is present deeper in the rubber member.

Figure 9:
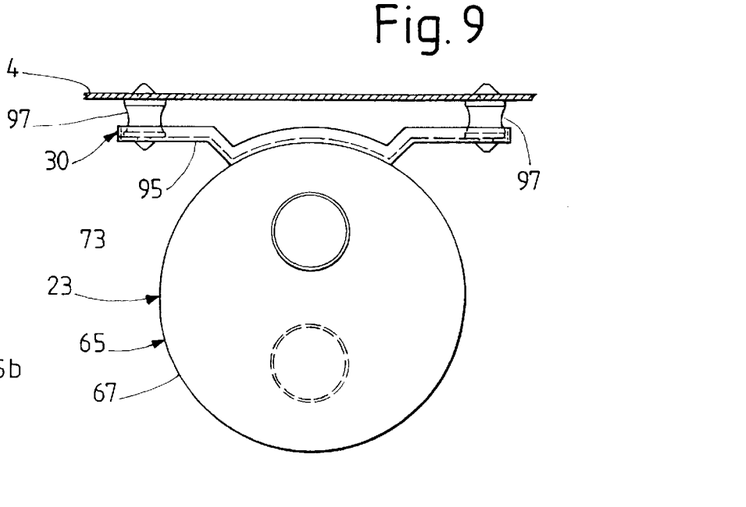
FIG. 9 shows a section through the vehicle bottom and a view of the second silencer.

Some or all of the connecting members 87, 97 of the holders 28, 29, 30, 31 can be replaced by connecting members 101 and/or 111, said connecting members 87, 97 being shown in FIGS. 7 to 9. The or each connecting member 111 can then be connected, for example, to a retaining member by the connecting members 114 and to the vehicle bottom by the fastening means 115, or vice versa. The vehicle bottom 4 can then accordingly be provided with welded-on threaded bushes or threaded bolts or the like. Furthermore, features of the connecting members 87, 97, 101, 111 can be combined with one another and it is possible to provide, for example, connecting members which have a mushroom-like rubber extension at one end and a screw or threaded bush at the other end or threaded bushes at both ends of the rubber member. Furthermore, it is possible to provide connecting members which have, at least at one end, a threaded part formed in the manner of a self-tapping screw or formed for riveting or welding. In addition, the rubber members may have, at least at one end, a polygonal end section for engaging a wrench or may even have the shape of a regular polygon essentially completely in cross-section, for example of a hexagon or octagon.

The axial dimension of the main section 87a of the connecting member 87 consisting completely of rubber and of the rubber members 102, 112 is, for example, about 50% to 150% of the maximum diameter of the relevant rubber member, said axial dimension being measured between the two support and/or end surfaces. In an exhaust system for a car, the maximum diameter is furthermore preferably about 15 mm to 50 mm. The said axial dimension may then be about 10 mm to 50 mm.

Figure 13:
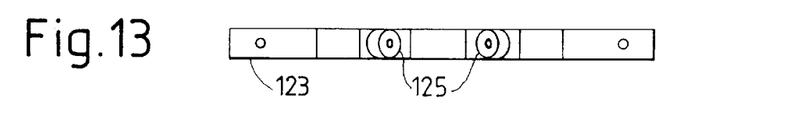
FIG. 13 shows a plan view of parts of the holder according to FIG. 12.

The holders 28, 29 which serve for fastening the first silencer 19 can be replaced by holders, one of which is shown in FIG. 12 and partly in FIG. 13 and is denoted by 121. The holder 121 has, as main components, a retaining member 122 directly engaging the housing 45 of the silencer 19, a support member 123 fastened to the vehicle bottom 4, and two connecting members 125 connecting said support member to the retaining member 122. The retaining member and the support member consist at least essentially of a metallic material, for example stainless steel, whereas the connecting members 125 comprise, at least to a large extent, rubber-elastic material and are formed identically or similarly to one of the connecting members 87, 97, 101, 111 described above. The retaining member 122 has a clip 126 enclosing the casing 47 of the silencer 19 and a closure 127 arranged at its ends and is detachably fastened to the silencer housing 45. The support member 123 consists, for example, of a multiply angled flat profile rod or U profile rod. The support member 123 is arranged underneath the silencer 19 and is detachably or nondetachably fastened to the vehicle bottom 4 on opposite sides of said silencer by fastening means 129. The fastening means 129 have, for example, self-tapping screws or standard metal screws which are screwed through holes in the support member 123 into the vehicle bottom 4 and/or into threaded bushes welded thereto. However, the screws could be replaced by catch members or rivets or other fastening means.

Figure 14:
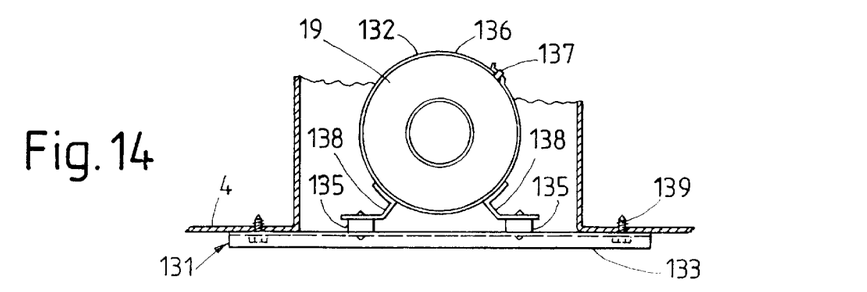
FIG. 14 shows a diagram analogous to FIG. 7 and illustrating another holder.
Figure 15:
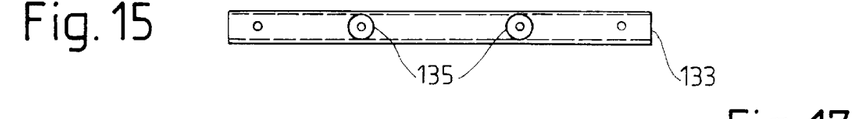
FIG. 15 shows a plan view of parts of the holder shown in FIG. 14.

Each or at least one of the holders 28 to 31 can also be formed, for example, according to the holder 131 shown in FIG. 14 and partly in FIG. 15. FIG. 14 shows a section of the vehicle bottom 4 and of the silencer 19, analogously to FIGS. 7 and 12. The holder 131 has a retaining member 132 fastened to the silencer, a support member 133 fastened to the vehicle bottom and two connecting members 135. The retaining member 132 once again has a clip 136 with a closure 137 and additionally two angled tabs 138, one end of each of which is fastened to the clip and which project away from said clip. The support member 133 consists of a straight U profile rod whose ends are fastened to the vehicle bottom 4 by fastening means 139. The connecting members 135 having a rubber member are fastened at one, upper end to one of the tabs 138 and at their other end to the support member 133.

Figure 16:
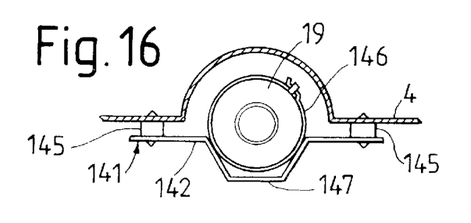
FIG. 16 shows a diagram analogous to FIG. 7 and illustrating another holder.

In that variant of the vehicle bottom 4 which is shown in FIG. 16, its upward-projecting bulge is less high than in FIG. 7, so that a cross-sectional region of the silencer 19 projects downward out of the tunnel bounded by the bulge. The holder 141 shown in FIG. 16 has a retaining member 142 and two connecting members 145. The retaining member 142 has a clip 146 enclosing the silencer 19 and a multiply angled flat or U profile rod 147. The middle section of the profile rod 147 bulges downward in accordance with the arrangement of the silencer and is fastened to the clip on both sides of the bulge. The connecting members 145 are arranged in the vicinity of the ends of the profile rod 142 and connect this to the vehicle bottom 4.

Figure 17:
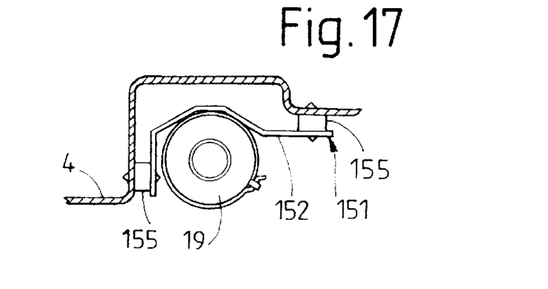
FIG. 17 shows a diagram analogous to FIG. 7 and illustrating yet another holder.

That section of the vehicle bottom 4 which is shown in FIG. 17 has a channel and/or an asymmetrical tunnel which opens downward, in which channel or in which tunnel at least part of the silencer 19 is present. The holder 151 shown in FIG. 17 has a retaining member 152 with a clip enclosing the silencer and a multiply angled and/or bent rod which is fastened to said clip and whose ends are connected to the vehicle bottom 4 by connecting members 155.

Unless stated otherwise above, the holders shown in FIGS. 12 to 17 are formed similarly to the holders 28 described with reference to FIGS. 7 and 8 and have connecting members which are identical or similar to one of the connecting members 87, 97, 101, 111.

The motor vehicle 201 shown in FIG. 18 once again comprises a car and has a vehicle body 202 with bodywork 203, a vehicle bottom 204 and a chassis 205, an internal combustion engine 206 with an engine housing 206a and an exhaust system 211 with an exhaust 212. Beginning at the engine, said exhaust has, in sequence along the exhaust gas flow path, an inlet and collecting means 213 with an exhaust manifold and a common outlet 213a, a first elastically deformable line member 216, a rigid pipe 217, a second elastically deformable line member 218, a catalytic converter 219, a pipe 220, a third elastically deformable line member 221, a first silencer 222, a pipe 223, a fourth elastically deformable line member 224, a pipe 225, a second silencer 226 and an outlet pipe 227. The catalytic converter 219 is thus arranged downstream of the elastically deformable line members 216, 218 and is present underneath the vehicle bottom 204. The catalytic converter 219 is elongated and has an axis approximately parallel to the longitudinal direction of the motor vehicle and a housing 235 with a casing 237 and two end walls 238, 239. The casing 237 has, for example, the shape of a flattened oval or of a circle in cross-section. The end walls 238, 239 are, for example, at least partly conical and/or vaulted and inclined relative to the axis. The housing 235 contains catalyst means for the catalytic purification of the exhaust gas. The casing and the end walls of the housing of the catalytic converter 219 may have wall thicknesses which are as small as those stated above for the silencer housing of the exhaust 12. The catalytic converter housing 235 may contain sound-absorbing and/or heat-insulating fiber materials, which are arranged analogously to those in the silencers of the exhaust 12 first described.

Figure 18:
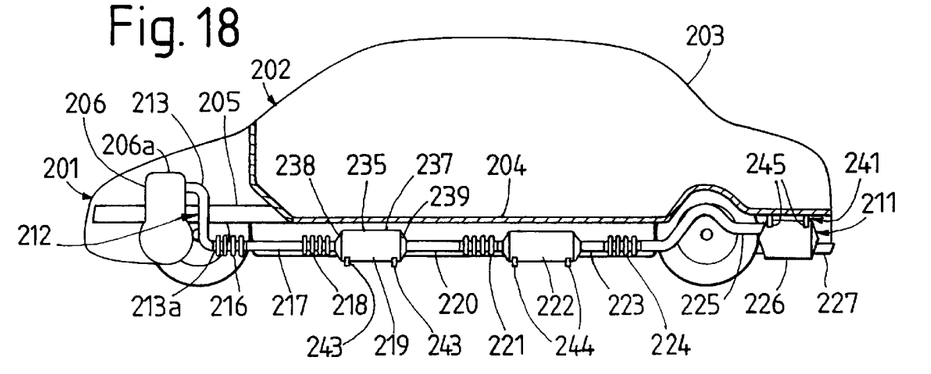
FIG. 18 shows a diagram, analogous to FIG. 1, of a motor vehicle having another exhaust system

The exhaust system 211 also has retaining means 241 which hold the housings of the catalytic converter and of the two silencers on the vehicle bottom 204. The retaining means have two holders 243 for holding the catalytic converter housing 235 and two holders 244, 245 each for holding the housings of the silencers 222 and 226, respectively. The holders 243, 244, 245 are formed identically or similarly to the holders described above and each have in particular two connecting members which completely or partly comprise a rubber member. Unless stated otherwise above, the exhaust system 211 can be formed identically or similarly to the exhaust system 11.

Figure 19:
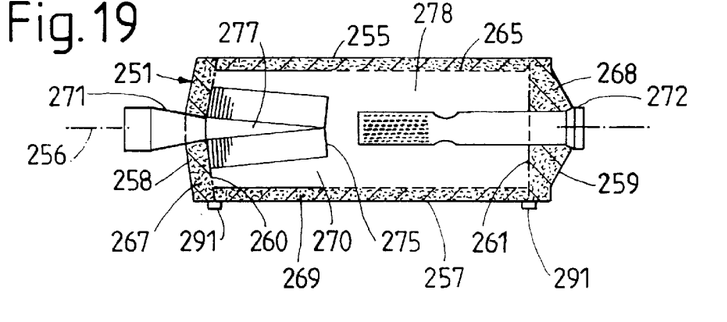
FIG. 19 shows a longitudinal section through a housing which contains catalyst means and forms a part of a silencer.

The means 251 shown in FIG. 19 forms a combined catalytic converter/silencer and has an elongated housing 255 with an axis 256, a casing 257 and two end walls 258, 259. The housing 255 contains, for example similarly to the silencer housings of the exhaust 12, two gas-permeable partitions 260, 261, a gas-permeable inner casing 265 and heat-insulating and sound-absorbing fiber materials 267, 268, 269. The casing 257, the end walls 258, 259, the partitions 260, 261 and the inner casing 265 may be formed similarly, and have similar wall thicknesses, to the silencers of the exhaust 12.

The partitions and the inner casing bound a hollow interior 270. The housing 255 is provided at its end walls with an inlet 271 and an outlet 272 and contains catalyst means 275. These divide the interior 270 into a first, inner interior region 277 and a second, outer interior region 278. The inlet 271 enters into the first interior region 277 at the partition 260. The outlet 272 is formed by a pipe which projects into the second interior region 278 and is formed, for example, similarly to the pipe 54 of the silencer 19, which pipe is shown in FIG. 3. The catalyst means 275 serve for the catalytic purification of the exhaust gas and have a large number of passages which connect the first interior region to the second one. The catalyst means 275 may have, for example, two catalyst bodies arranged in a V-shape and may be formed similarly to those disclosed in U.S. Pat. No. 5,593,645 and in the corresponding EP 0 676 535 A. The content of these publications is hereby incorporated into this application, provided that there are no contradictions. The housing 255 is held on the vehicle bottom by two holders 291. The holders 291 may be formed similarly to those holders of the silencers which are described above.

The means 251 serving both for catalytic exhaust gas purification and for silencing may, for example, be installed in place of the first silencer 19 in the exhaust 12 shown in FIG. 1. The catalytic converter 14 of the exhaust 12 then serves only as a preliminary and/or starting catalytic converter and may have relatively small dimensions. The means 251 may also replace the catalytic converter 219 and the first silencer 222 of the exhaust 212 shown in FIG. 18.

The motor vehicle and its exhaust system can furthermore be modified in various ways.

It is possible in particular also to combine features of different embodiments with one another. For example, in the exhaust 212 shown in FIG. 18, it is also possible to provide a preliminary and/or starting catalytic converter which is rigidly connected to the inlet and collecting means 213, analogously to the catalytic converter 214 in FIG. 1, and is arranged upstream of the first elastically deformable line member.

If a motor vehicle has an exhaust system with more than one exhaust, each exhaust may be connected to some cylinders of the internal combustion engine of the vehicle and otherwise formed in the manner described. If the engine consists of a diesel engine, the catalytic converter can be omitted. Furthermore, the exhaust may have only a single silencer.

In the exhaust 12 or 212 shown in FIGS. 1 and 18, respectively, one of the two elastically deformable line members 16 and 18 or 216 and 218, respectively, can be omitted.

If the motor vehicle consists of a truck or bus or the like, the pipes or the silencers may have larger diameters than in the case of a car. The wall thicknesses of the pipes, of the catalytic converter housings and/or silencer housings arranged downstream of at least one elastically deformable line member and held on the vehicle body and of the partitions and inner casings may however nevertheless be, for example, only about 0.5 mm or slightly more. Furthermore, the holders may then be fastened at least partly to the chassis instead of on the bottom of the motor vehicle.

Furthermore, each housing may be connected to the vehicle body only by three connecting members which are at least partly rubber-elastic. In this case, the three connecting members should not all lie on one and the same straight line and preferably form a triangle in a rectangular projection onto the plane on which the vehicle stands. Furthermore, at least one or each silencer may be connected only by a single holder to the vehicle bottom and/or chassis. The catalytic converter housing and/or silencer housing arranged downstream of at least one elastically deformable line member and preferably downstream of two such members may be fastened more or less rigidly on the vehicle body even without rubber-elastic connecting members, at one connecting point or a plurality of connecting points. Moreover, the silencers or at least one of them may have a housing whose casing is, for example, approximately oval instead of circular in cross-section.

What is claimed is:
1. An exhaust system for a motor vehicle having a vehicle body and an internal combustion engine, said exhaust system comprising an exhaust which can be connected to the internal combustion engine and which has at least one deformable line member, a pipe arranged downstream of the line member, and a silencer, with a housing, arranged downstream of said line member and having retaining means for holding the exhaust on the vehicle body, wherein the pipe has a wall thickness of at most 1 mm, wherein the retaining means has two holders associated with the housing, wherein the housing defines an axis, wherein each of said two holders has a pair of connecting members, wherein the two holders are spaced from one another along the axis, and wherein the two connecting members of each holder are spaced from one another in a direction perpendicular to the axis.

2. An exhaust system as claimed in claim 1, wherein the said wall thickness is essentially at most 0.8 mm.

3. An exhaust system as claimed in claim 1, wherein said pipe is arranged between said deformable line member and said silencer, wherein the exhaust comprises a second silencer having a housing, wherein the retaining means includes two further folders associated with the housing of the second silencer, spaced along an axis of the second silencer, each further holder having two connecting members spaced from each other in a direction perpendicular to the axis of the second silencer, and wherein the exhaust system further comprises at least one pipe arranged between the two silencers, and wherein the pipes have a wall thickness which is at most equal to 1 mm.

4. An exhaust system as claimed in claim 1, wherein the housing of said silencer is a housing with a metallic casing whose wall thickness is essentially at most 1 mm.

5. An exhaust system as claimed in claim 1, wherein the housing of said silencer is a housing with a metallic casing whose wall thickness is essentially at most 0.8 mm.

6. An exhaust system as claimed in claim 4, wherein sound-absorbing and heat-insulating material is present between the casing and a hollow interior in the housing of said silencer.

7. An exhaust system as claimed in claim 4, wherein the housing of said silencer has two end walls whose wall thicknesses are essentially at most 1 mm.

8. An exhaust system as claimed in claim 4, wherein the housing of said silencer has two end walls whose wall thicknesses are essentially at most 0.8 mm.

9. An exhaust system as claimed in claim 7, wherein the housing contains, between the end walls and the hollow interior, sound-absorbing and heat-insulating material.

10. An exhaust system as claimed in claim 7, wherein the housing of said at least one silencer contains an inner casing and two partitions, the inner casing and the partitions essentially having wall thicknesses of at most 0.8 mm and the casing and the end walls together with the inner casing and the partitions bounding intermediate spaces which contain should-absorbing and heat-insulating material.

11. An exhaust system as claimed in claim 1, wherein the exhaust has at least one housing which is arranged downstream of said line member, contains catalyst means and has a casing with a wall thickness which is essentially at most 1 mm.

12. An exhaust system as claimed in claim 1, wherein the connecting members coordinated with the or the same housing define a polygon in a projection onto a plane on which the motor vehicle stands.

13. An exhaust system as claimed in claim 1, wherein each connecting member has a rubber member, connecting means connected to the exhaust and connecting means intended for connection to the vehicle body, and wherein the rubber member between the connecting means is essentially solid in cross-section.

14. An exhaust system as claimed in claim 1, wherein each connecting member is formed at least partly by a rubber member which is essentially rotationally symmetrical with respect to an axis and/or forms essentially a regular polygon in cross-section.

15. An exhaust system as claimed in claim 1, wherein each connecting member has a main section or body consisting at least essentially of rubber and having two support surfaces facing away from one another, and wherein an axial dimension of the main section, measured from support surface to support surface, is 50% to 150% of the maximum diameter of the main section.

16. An exhaust system as claimed in claim 1, wherein another deformable line member is arranged upstream of the housing, and wherein the deformable line members arranged upstream of the housing are formed, in order to compensate changes in length of up to at least 5 mm from at least one fixed part of the exhaust present upstream of the housing.

17. An exhaust system for a motor vehicle having a vehicle body and an internal combustion engine, said exhaust system comprising an exhaust which can be connected to the internal combustion engine and which has at least one deformable line member, a pipe arranged downstream of the line member, and a silencer, with a housing, arranged downstream of said line member and having retaining means for holding the exhaust on the vehicle body, wherein the pipe has a wall thickness of at most 1 mm, wherein the retaining means for the housing has at least three elastically deformable connecting members not all lying on a common straight line, wherein each connecting member has a rubber member, connecting means connected to the exhaust and connecting means for connection to the vehicle body, and wherein the rubber member between the connecting means has essentially a solid cross-section.

18. An exhaust system for a motor vehicle having vehicle body and an internal combustion engine, said exhaust system comprising an exhaust which can be connected to the internal combustion engine and which has at least one deformable line member, a pipe arranged downstream of the line member, and a silencer, with a housing, arranged downstream of said line member and having retaining means for holding the exhaust on the vehicle body, wherein the pipe has a wall thickness of at most 1 mm, wherein the retaining means for the housing has at least three elastically deformable connecting members not all lying on a common straight line, and wherein each connecting member is formed at least partly by a rubber member which is at least one of essentially rotationally symmetrical with respect to an axis and forms essentially a regular polygon in cross-section.

19. An exhaust system for a motor vehicle having a vehicle body and an internal combustion engine, said exhaust system comprising an exhaust which can be connected to the internal combustion engine and which has at least one deformable line member, a pipe arranged downstream of the line member, and a silencer, with a housing, arranged downstream of said line member and having retaining means for holding the exhaust on the vehicle body, wherein the pipe has a wall thickness of at most 1 mm, wherein the retaining means for the housing has at least three elastically deformable connecting members not all lying on a common straight line, wherein each connecting member has an axis, a diameter and one of a main section and a body consisting essentially of rubber and having two support surfaces facing away from one another, and wherein an axial dimension of the one of the main section and the body, measured from support surface to support surface, is 50% to 150% of the maximum diameter of the one of the main section and the body.

20. An exhaust system for a motor vehicle having a vehicle body and an internal combustion engine and defining a longitudinal direction, said exhaust system comprising an exhaust which can be connected to the internal combustion engine and has a deformable line member, pipe means arranged downstream thereof, and a housing which is arranged downstream of said line member and is at least one of containing catalyst means and belonging to a silencer, and having retaining means for holding the exhaust on the vehicle body, wherein the retaining means has two holders which engage the exhaust downstream of the line member near opposite ends of the housing and are formed in such a way that the housing is deflected at most 5 mm in a direction perpendicular to the longitudinal direction of the motor vehicle under the action of one of a constant acceleration of 10 m/s$^2$ and of a constant force of 100 N, and wherein the pipe means has a wall thickness of at most 1 mm.

21. An exhaust system as claimed in claim 20, wherein the retaining means is formed in order to hold the housing in such a way that this housing is deflected at most 5 mm under the action of one of a constant acceleration of 10 mn/s$^2$ and of a constant force of 100 N in any direction.

22. An exhaust system as claimed in claim 20, wherein the retaining means is formed in order to hold the housing on the vehicle body in such a way that the housing is deflected at most 2 mm under the action of one of a constant acceleration of 10 m/s$^2$ and of a consultant force of 100 N in any direction.

23. An exhaust system as claimed in claim 20, wherein the retaining means is formed in order to hold the housing on the vehicle body in such a way that this housing, in the state separated from the remaining parts of the exhaust, is deflected at most 2 mm by a constant acceleration or a constant force having the said magnitude and any direction.

24. An exhaust system as claimed in claim 20, wherein the retaining means for the housing have at least one holder which is connected directly to the housing.

25. An exhaust system as claimed in claim 20, wherein the retaining means for the housing have at least three elastically deformable connecting members not all lying on a common straight line.

26. An exhaust system as claimed in claim 20, wherein the housing defines an axis, wherein the retaining means for the housing have a first pair and a second pair of connecting members, wherein the two pairs of connecting members are a distance apart from one another along the axis, and wherein the two connecting members belonging to the same pair are a distance apart from one another perpendicular to the axis.

27. An exhaust system as claimed in claim 20, wherein the holders have a configuration which enables the holder to directly engage the vehicle body.

28. An exhaust system as claimed in claim 20, wherein the exhaust has a further deformable line member disposed between the line member and the housing and a pipe connecting the further line member with the line member.

29. An exhaust system as claimed in claim 20, wherein the exhaust has a further housing arranged downstream of the housing, and wherein the retaining means has two holders associated with each of the housing and the further housing, respectively, the two holders engaging the exhaust near opposite ends of an associated housing, all of the holders have a configuration enabling the holders to directly engage the vehicle body.

30. An exhaust system for a motor vehicle having a vehicle body and an internal combustion engine and defining a longitudinal direction, said exhaust system comprising an exhaust connectable to the internal combustion engine and having two deformable line members, a pipe for connecting the two line members with each other, a first housing arranged downstream of the two line members and being one of containing catalyst means and belonging to a silencer, second housing belonging to the silencer and located downstream of the first housing, a further pipe located downstream of the two line members, and retaining means for holding the exhaust downstream of the two line members and having a configuration enabling the retaining means to directly engage the vehicle body, wherein the retaining means holds at least the first housing in such a way that the housing is deflected at most 5 mm in a direction perpendicular as to the longitudinal direction of the motor vehicle under an action of one of a constant acceleration of 10 m/s$^2$ and of a constant force of 100N, and wherein the pipes have a wall thickness of at most 1 mm.

31. An exhaust system as claimed in claim 30, wherein the retaining means has two holders associated with each of the first and second housings and engaging the exhaust near opposite ends of an associated housing.

32. An exhaust system as claimed in claim 30, wherein each of the deformable line members comprises a bellows.

33. An exhaust system as claimed in claim 30, wherein the pipe and the further pipe have a wall thickness of at most 8 mm, and wherein the first and second housings have each a metallic casing having a wall thickness at most 8 mm.

34. An exhaust system as claimed in claim 30, wherein one of the line members has an inlet rigidly connectable to the engine exhaust path, and wherein the connecting pipe is not associated with any housing.

35. A motor vehicle, comprising a body;

an internal combustion engine; and an exhaust system comprising an exhaust which can be connected to the internal combustion engine and which has at least one deformable line member, a pipe arranged downstream of said line member, and a silencer, with a housing, arranged downstream of said line member and having retaining means for holding the exhaust on the vehicle body, wherein the pipe has a wall thickness of at most 4 mm, wherein the retaining means has two holders associated with the housing, wherein the housing defines an axis, wherein each of said two holders has a pair of connecting members, wherein the two holders are spaced from one another along the axis, and wherein the two connecting members of each holder are spaced from one another in a direction perpendicular to the axis.

* * * * *